J. O. FISHER.
FUEL OIL BURNER FOR BOILERS.
APPLICATION FILED DEC. 2, 1918.
1,326,488.
Patented Dec. 30, 1919.
3 SHEETS—SHEET 2.
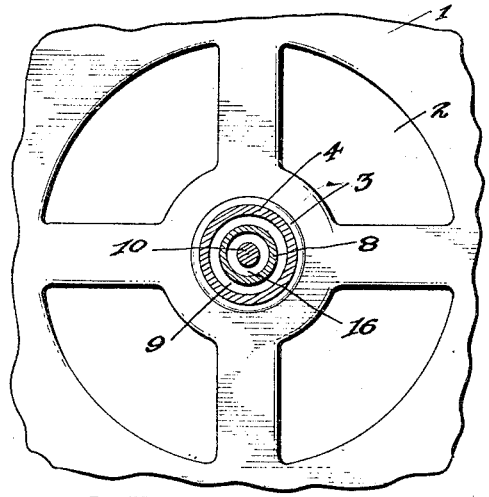
Fig. 3.
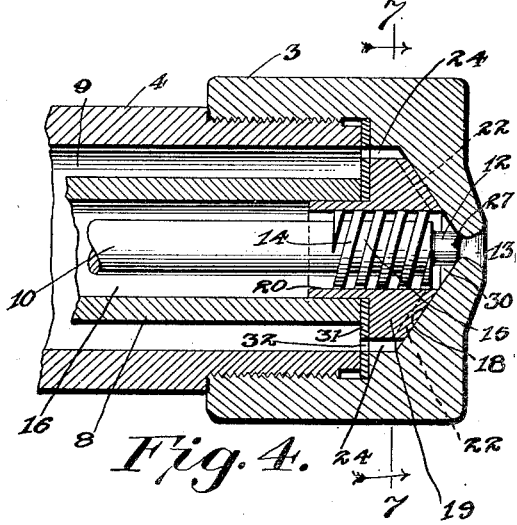
Fig. 4.
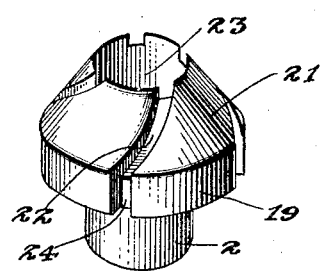
Fig. 5.
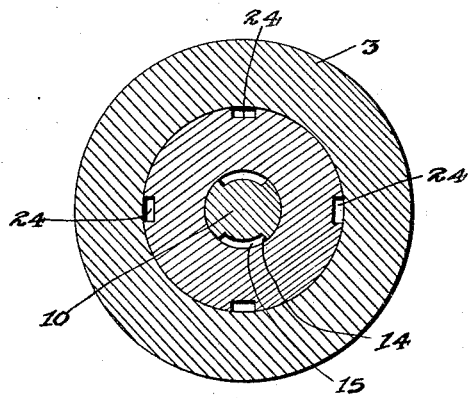
Fig. 7.
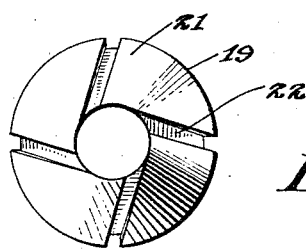
Fig. 6.
Witness
Inventor
Joseph O. Fisher
By
Attorney

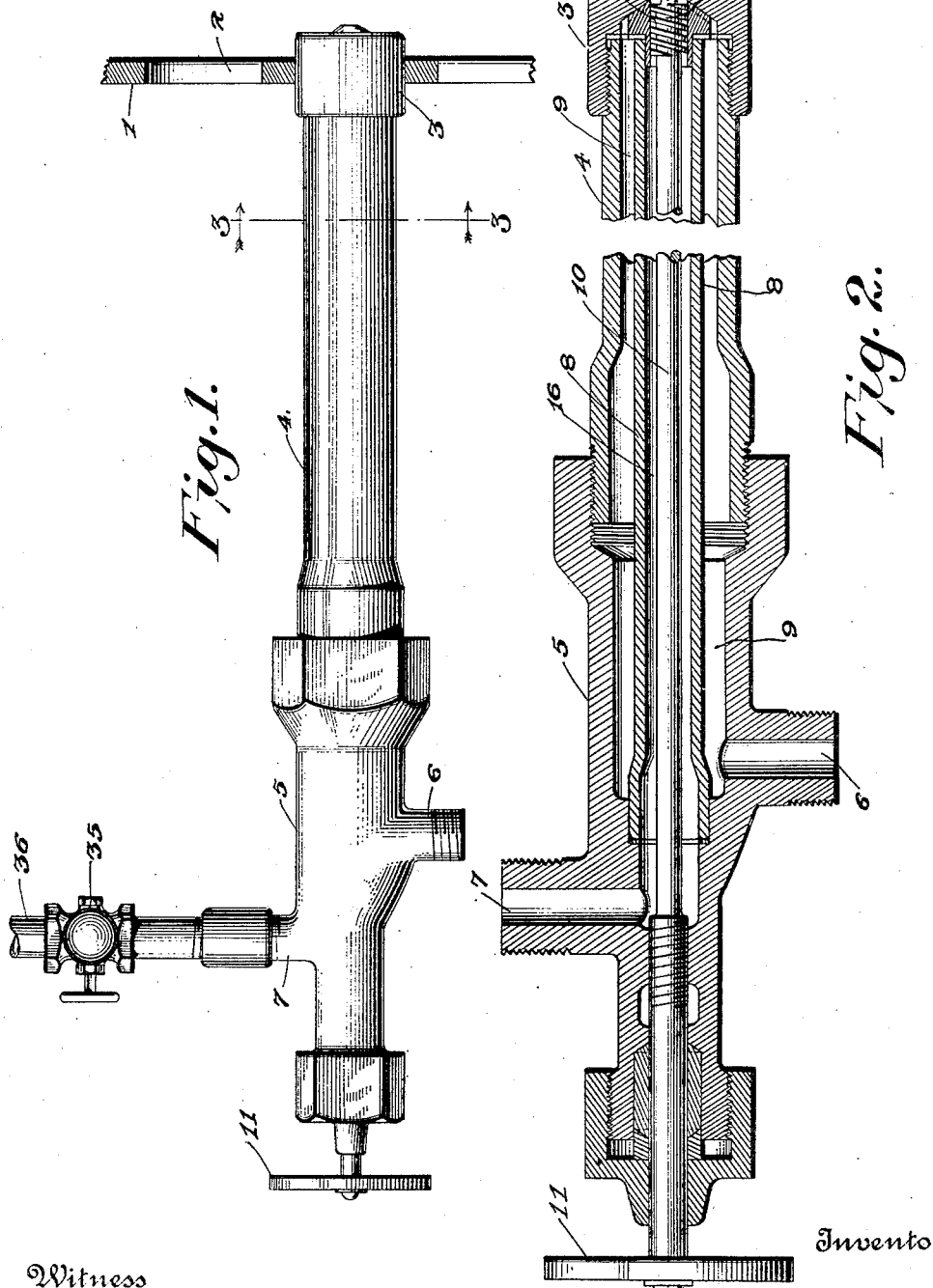

J. O. FISHER.
FUEL OIL BURNER FOR BOILERS.
APPLICATION FILED DEC. 2, 1918.

1,326,488.

Patented Dec. 30, 1919.
3 SHEETS—SHEET 3.

Inventor
Joseph O. Fisher

Witness

By

Attorney

UNITED STATES PATENT OFFICE.

JOSEPH O. FISHER, OF WASHINGTON, DISTRICT OF COLUMBIA.

FUEL-OIL BURNER FOR BOILERS.

1,326,488.  Specification of Letters Patent.  Patented Dec. 30, 1919.

Application filed December 2, 1918. Serial No. 265,042.

*To all whom it may concern:*

Be it known that I, JOSEPH O. FISHER, a commander in the United States Navy, and a citizen of the United States, residing at Washington, in the District of Columbia, have invented certain new and useful Improvements in Fuel-Oil Burners for Boilers; and I do hereby declare the following to be a full, clear, and exact description of the invention, such as will enable others skilled in the art to which it appertains to make and use the same.

This invention relates to a fuel oil burner for boilers, and has for its object to provide an apparatus of this kind which will be more efficient, and certain, in action and relatively less costly to construct than those heretofore proposed.

With these and other objects in view the invention consists in the novel details of construction and combinations of parts more fully hereinafter disclosed, and particularly pointed out in the claims.

Referring to the accompanying drawings forming a part of this specification in which like numerals designate like parts in all the views:—

Figure 1 is an elevational view of a fuel oil burner made in accordance with this invention;

Fig. 2 is an enlarged longitudinal sectional view of the burner detached from the boiler;

Fig. 3 is an enlarged sectional view taken on the line 3—3 of Fig. 1, looking in the direction of the arrows;

Fig. 4 is an enlarged longitudinal sectional detail view of the burner detached;

Fig. 5 is a perspective view of the cone-shaped fuel rotating member detached from the other parts;

Fig. 6 is an end view of the parts shown in Fig. 5;

Fig. 7 is a sectional view taken on the line 7—7 of Fig. 4, looking in the direction of the arrows;

Figure 8:
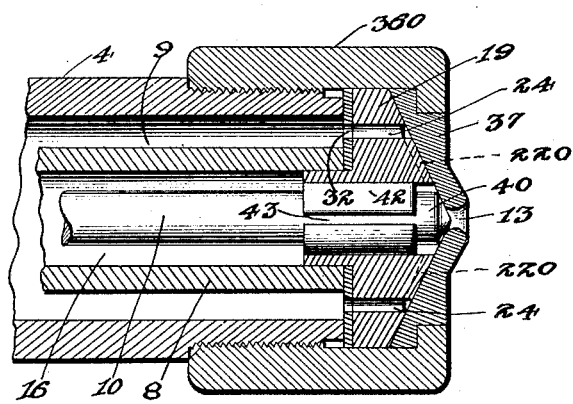
Fig. 8 is a sectional view similar to Fig. 4 of a slightly modified form of construction.

1 indicates a portion of the combustion chamber of a boiler provided with any suitable apertures 2, for admitting air, 3 the extreme tip or cap of the fuel nozzle, into which screw threads at one end the outer tube or casing 4. The other end of said casing 4 screw threads into the member 5 having the inlet 6, and outlet 7 as shown. Located inside the tube 4 and member 5, is the inner tube or sleeve 8, providing the annular chamber 9, and inside said sleeve 8 is the valve stem or spindle 10, provided with the hand operating means 11 at one end, and the valve 12 at its other end. The said valve controls the fuel port 13 which is an outlet port for the nozzle and an inlet port for the combustion chamber with which the cap 3 is provided, and it is equipped with the helically disposed ribs 14 providing the helical passages 15 communicating with the chamber 16 between said spindle 10 and said sleeve 8, as shown.

The cap is hollowed out to provide the cone-shaped cavity 18, see Fig. 4, and fitting said cavity is the nozzle member 19 provided with the corresponding cone-shaped surface 21, and the hollow sleeve extension 20 fitting the interior of the sleeve 8. Said member 19 is further provided with the axially inclined grooves 22, which are tangentially disposed to the central bore 23 of the member 19, and which bore accommodates the helical members 14 as shown. Said member 19 is further provided with the short grooves 24 connecting said inclined grooves 22 with the chamber of passage 9 as shown.

Figures 10, 11:
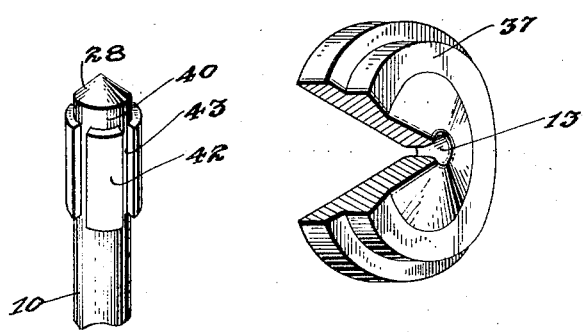
Fig. 10 is a perspective view of the valve of Fig. 8 detached from its associated parts.
Fig. 11 is a perspective view partially broken away of the inlet port carrying member shown in Fig. 8.
Figure 12:
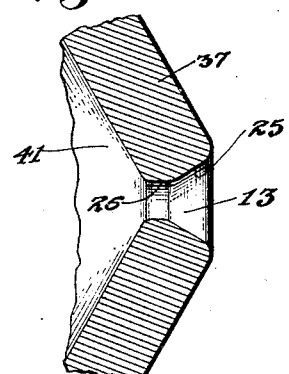
Fig. 12 is an enlarged sectional view of a portion of the parts shown in Fig. 11, illustrating the shape of the fuel inlet port.

The fuel port 13 is preferably shaped as best shown in Fig. 12, with the flared rounded surface 25, and the slightly flaring rounded surface 26, against which the rounded edge 27 of the valve in Fig. 4, or the cone-shaped surface 28 of the valve in Fig. 10 may fit. It is desirable that the foregoing valve and port surfaces be very smooth and highly polished, in order to reduce friction, and to produce a better spray.

The passages 22 are inclined to the axis of the port 13 as shown, and they enter the chamber 30 formed by the bore 23 and valve 12, as will be readily understood from Figs. 4 and 5 of the drawings.

A copper gasket 31 provided with holes 32 is conveniently placed between the extreme ends of the sleeves 4 and 8, and the cone-shaped member 19.

The operation of the parts so far disclosed is as follows:—

Fuel oil may be forced into the inlet 6 by any suitable means, as for example, a pump, whereupon it passes along the outer annular passage 9 through the holes 32 of the gasket 31, through the straight passages 24 of the member 19, through the inclined tangentially arranged passages 22 of said member 19, whereupon said oil enters the chamber 30, and receives a very high rotational velocity. The velocity of the oil it will be observed will increase as the center of the chamber 30 is reached, and when the valve 12 is removed from its seat by operating the hand wheel 11, the center of rotation of the oil will be opposite the center of the port 13, whereupon the pressure due to the inclination of the passages 22, and also due to the static pressure in the pipe line, will force the oil rotating at its highest velocity through said port 13 into the combustion chamber. The fuel oil will naturally take on the form of a cone-shaped spray, whereupon air will pass in through the openings 2 in the plate 1, and mix with said spray, when it will be ready for ignition. The oil which is not forced through the port 13 will pass through the helical passages 15 into the annular passage 16, and through said annular passage the oil will enter the exit 7, whereupon it will pass the hand operated valve 35 with which the exit pipe 36 is provided. It is obvious that by regulating the valve 35, the amount of pressure in the chamber 30 can easily be regulated. Stated in other words, the force of the spray entering the combustion chamber can be easily regulated by merely leaving valve 12 wide open and turning the valve 35. Of course, the pressure of the fuel entering the inlet 6 is kept substantially constant.

All the parts are made smooth and preferably polished as above intimated, and this is found to greatly improve the combustion, since the avoidance of abrupt or angular surfaces greatly reduces the friction, and therefore it promotes the velocity of the oil entering the combustion chamber.

Figure 9:
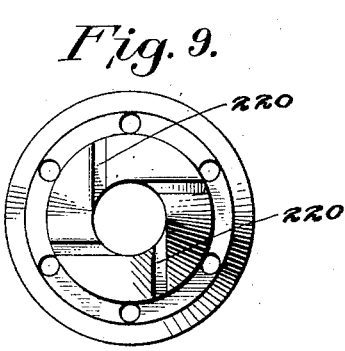
Fig. 9 is a top plan view of the cone-shaped fuel rotating member detached from the parts shown in Fig. 8.

In the somewhat modified form of construction illustrated in Fig. 8, the outer tube 4 is provided with a cap 360 which secures the member 37 between itself and the cone-shaped member 19. Its fuel port 13 is or may be of the same shape as the port 13 illustrated in Fig. 2, and the passages 24 of the member 19 are or may be of the same shape as the corresponding passages illustrated in Fig. 4. But the passages 220 in Fig. 8 are preferably made straight as illustrated in Fig. 9, instead of curved as are the passages 22 in Fig. 5.

The valve 40, however, is of a different shape from the valve 12, in that it is provided with the cone-shaped surfaces 28 fitting the correspondingly shaped surface 41 in the member 37, and instead of having the helically disposed members 14 providing the helically disposed passages 15, the said valve 40 is provided with the straight members 42 providing the straight passages 43, as best illustrated in Fig. 10. The spindle or valve stem 10 is or may be of the same construction as the valve stem 10 in Fig. 2.

The gasket 31 provided with the holes 32 registering with the passages 24, is conveniently located between the ends of the sleeves 4 and 8, as in the case in Fig. 2.

The operation of this modified form of construction illustrated in Figs. 8 to 12 is the same as that illustrated in Figs. 2 to 7, except the passages 220 being straight instead of curved as in the previous figures, the rotation of the fuel oil is somewhat modified, and further the escape of the unconsumed oil is through the straight passages 43 into the annular passage 16, instead of through the helically disposed passages 15, as is the case in Fig. 2. Further, the valve 40 being provided with the cone-shaped surface 28, acts to produce a somewhat different shape of spray than is the case with the valve 12 of the shape shown in Fig. 2.

Figures 13, 15:
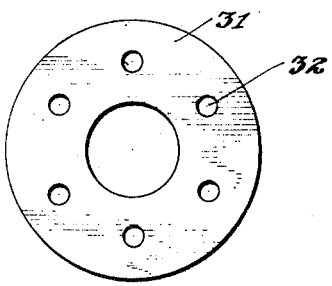
Fig. 13 is a plan view of a copper gasket used between the inner and outer sleeves and the conical member shown in Fig. 11.
Fig. 15 is a perspective view of the valve member detached from the parts shown in Fig. 14.
Figure 14:
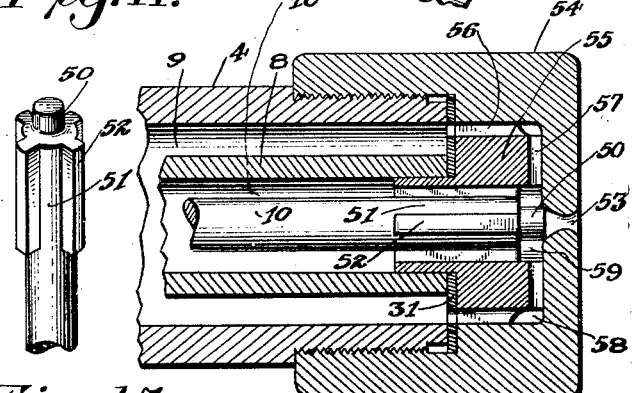
Fig. 14 is an enlarged sectional view of a still further modified form of burner tip.

Coming now to the still further modified form of the invention illustrated in Figs. 14 and 15, the valve 50 is or may be of the same shape as the valve 12 in Fig. 2, but it is associated with relatively very wide straight passages 51 and the relatively very narrow straight members 52 forming said passages. Further, the fuel port 53 is of a different shape from the port 13, in that its widest portion is next to the valve 50, while its more restricted outlet is next to the combustion chamber, which is substantially the reverse of the construction shown in Figs. 2 and 12. Further, the shape of the outer cap or tip member 54 is somewhat different from the shape of the corresponding cap 3 shown in Fig. 2.

In addition to the above differences, the oil rotating member 55 is quite different from the corresponding cone-shaped member 19 of the preceding figures, in that it is not cone-shaped at all, but is shaped more like a sleeve, having the straight passages 56 and 57 disposed at right angles to each other, and associated with the annular chamber 58, as is clearly shown in Fig. 14. The annular chamber 59 communicates with said passages 57, and the oil receives its high rotation therein in substantially the same manner as in the previous figures.

From the foregoing it will be seen that in all of the forms of the invention fuel oil may be injected into the combustion chamber of the boiler in a manner substantially the same as is disclosed in connection with Fig. 2, and that through a means such as the hand operated valves 35 and 12, 40, or 50, both the pressure of the oil entering the chamber, and the character of the cone-shaped spray, may be readily controlled.

It is obvious that those skilled in the art may vary the details of the construction as well as the arrangement of parts without departing from the spirit of the invention, and therefore I do not wish to be limited to the above disclosures, except as may be required by the claims.

What I claim is:—

1. In an oil burner for boilers the combination of an outer sleeve; an inner sleeve spaced from said outer sleeve to form an inlet passage; a valve stem in said inner sleeve forming an exit passage; a burner tip provided with a fuel delivery port associated with said outer sleeve; a valve carried by said stem coacting with said port; and a hollow member provided with straight and tangentially arranged passages surrounding said valve, forming a chamber with which said tangential passages communicate, and in which the oil may receive a high rotational velocity and forming a return passage for the oil between said chamber and said exit passage, substantially as described.

2. In an oil burner for boilers the combination of an outer sleeve; an inner sleeve spaced from said outer sleeve to form an inlet passage; a valve stem in said inner sleeve forming an exit passage; a pipe connection provided with a valve connected with said exit passage; a burner tip provided with a fuel delivery port associated with said outer sleeve; a valve carried by said stem coacting with said port; members carried by said stem forming passages joining said port and said exit passage; and a hollow member provided with straight and tangentially arranged passages surrounding said valve, and forming a chamber with which said tangential passages communicate, and in which the oil may receive a high rotational velocity, substantially as described.

3. In an oil burner for boilers, the combination of a member provided with a fuel delivery port; a hand operated valve controlling said port; a hollow member surrounding said valve to form a chamber in which the oil may rotate, and provided with passages disposed tangentially to said chamber in a plane substantially perpendicular to the axis of said port; an inner sleeve associated with said member fitting over an extension thereof and forming an exit for the oil, said hollow member also forming a passage connecting with said chamber and said exit; and a hand operated valve controlling said exit and the pressure in said chamber, substantially as described.

4. In an oil burner for boilers, the combination of an outer sleeve; an inner sleeve spaced from said outer sleeve to form an inlet annular passage; a valve stem located in and spaced from said inner sleeve to form an exit passage; a pipe provided with a hand operated valve connected to said exit passage; a burner tip provided with a fuel delivery port; a valve carried by said valve stem controlling said port; a member surrounding said port to form a chamber and provided with pairs of passages at an angle to each other, some of which are tangentially disposed to said chamber coacting with said inner sleeve, said member also forming a passage connecting said chamber and said exit passage; and hand operated means for controlling said last named valve and port, substantially as described.

In testimony whereof I affix my signature.

JOSEPH O. FISHER.